Feb. 15, 1949.         C. O. CHRISTENSEN         2,461,678
                          LOADING RAMP
Filed Oct. 14, 1946                       2 Sheets-Sheet 1

INVENTOR.
Carl O. Christensen
BY
Mellin & Hanscom
ATTORNEYS

Feb. 15, 1949.  C. O. CHRISTENSEN  2,461,678
LOADING RAMP
Filed Oct. 14, 1946  2 Sheets-Sheet 2

INVENTOR.
Carl O. Christensen
BY
Mellin + Hanscom
ATTORNEYS

Patented Feb. 15, 1949

2,461,678

UNITED STATES PATENT OFFICE 2,461,678

LOADING RAMP

Carl O. Christensen, Walnut Creek, Calif., assignor to Roll-Rite Corporation, Oakland, Calif., a corporation of California Application October 14, 1946, Serial No. 703,180

6 Claims. (Cl. 14—72)

This invention relates to ramps or aprons for use between railway car platforms and loading docks to enable trucking therebetween.

It is the principal object of my present invention to provide a generally improved ramp or apron capable of being expeditiously positioned to bridge the gap between a car platform and a loading dock and secure it against inadvertent dislodgment.

In practicing my invention, I provide a rigid, substantially flat bridge member to extend between and bear on the surface of a car platform and a loading dock, to enable hand trucks to traverse thereover between the car and the dock. To prevent dislodgment, this bridge member is fitted with extensible abutment means which engages the side of the car platform at one end and to engage the side of the dock at the other end, so as to prevent inadvertent dislodgment of the bridge member after it has been positioned. The bridge member is fitted substantially centrally with a medium enabling the fork of a truck to engage the same to position it for use or to remove it from such position.

One form which the invention may assume is exemplified in the following description and illustrated by way of example in the accompanying drawings, in which.

Referring more particularly to the accompanying drawings, 10 indicates a ramp or apron for use in bridging the gap between a railway car platform and a dock in order that trucks may be moved therebetween for loading or unloading the car. The longitudinal dimension of the ramp or apron is of sufficient length that it will extend between and overlie the upper surfaces of a railway car and dock where said spacing is of the usual width. In width, one end of the apron is substantially the width of a standard freight car door opening so that it may project thereinto, so that the end of the ramp or apron may overlie and bear on the car platform. At its other end the ramp is of slightly greater width, as illustrated.

I prefer to form the ramp of a substantially flat bridge member 11 formed of steel plate or other suitable material. In this instance the bridge member 11 is slightly arched for stiffness, and to aid in this stiffness longitudinal stiffeners 12 are provided suitably welded to the underside of the plate which forms the bridge member 11. Also for stiffening purposes and to prevent inadvertent movement of the trucks off the side of the ramp, the opposite sides of the bridge member are formed with upturned flanges 14, as illustrated.

Figure 5:
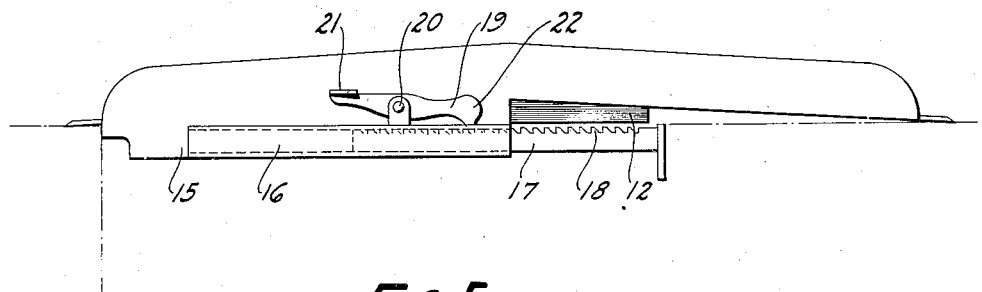
Fig. 5 is a view in side elevation of my improved device.

Also, at each side the bridge member 11 is fitted with a fixed abutment member 15 which extends short of the end of the bridge member 11, as illustrated in Fig. 5, so that the end thereof may engage the side of either the railway car or the side of the dock when the bridge member 11 is positioned to have its end bear on the car or dock. Formed on each abutment member is a longitudinal guide 16 within which is disposed for longitudinal reciprocation a movable abutment member 17. This abutment member 17, of course, is reciprocable in a direction longitudinal of the ramp or apron 10.

The upper surface of each movable abutment 17 is formed with ratchet rack teeth 18 for cooperation with a weighted pawl 19 pivoted as at 20 to the bridge member. A foot treadle 21 is formed on the pawl for operating the same. The teeth engaging end 22 of the pawl 19 is weighted so that it will normally seek to engage with the ratchet teeth 18.

When the ramp is positioned for use, the movable abutment member 17 is moved axially to a position where the distance between the outer ends of the fixed abutment 15 and the movable abutment 17 is considerably less than the spacing between the adjacent sides of the car and dock. After the ramp has been positioned, the two movable abutment members 17 are moved longitudinally until their ends abut against the side of the dock or car opposite the side against which the fixed abutment 15 abuts. Thereafter the pawls 19 are permitted to engage with the ratchet teeth 18, to latch the movable abutments 17 in position, which effectively prevents longitudinal movement of the bridge member 11 so that it cannot become inadvertently dislodged from its bearing engagement with the car platform or dock.

When it is desired to remove the platform, it is only necessary to depress the treadles 21 of the pawls 19, releasing the pawls 19 from engagement with the movable abutments 17 so that the latter may be withdrawn.

By the use of the extensible abutments shown and described, it is obvious that the ramp may be latched securely in position between a car platform and a dock.

To position the ramp, which is, of course, quite heavy due to its steel construction, and to enable it to be removed from operative position and transported to a second place of use, I provide a bail 23 which is pivoted in lugs 24 on the underside of the bridge member 11 beneath the upper surface thereof. The bridge member 11 is formed in its face with a depression or opening 25 complemental in shape to the bail 23 so as to receive the bail 23, leaving the surface of the bridge member 11 flush. Stop members 26 are provided to limit the downward movement of the bail in the depression 24.

Figure 1:
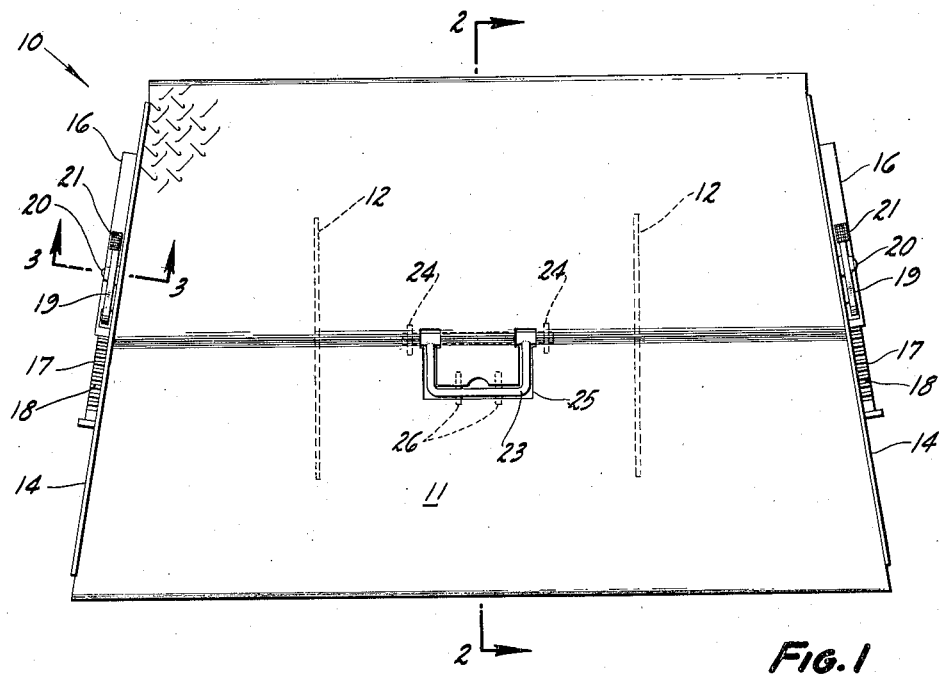
Fig. 1 is a plan view of a ramp or apron embodying the preferred form of my invention.
Figure 2:
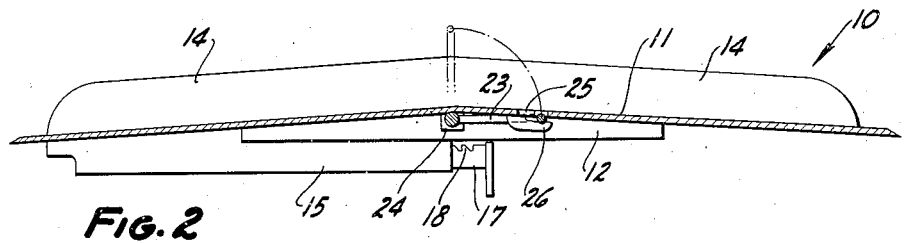
Fig. 2 is a central longitudinal section through the same taken on line 2—2 of Fig. 1.
Figure 3:
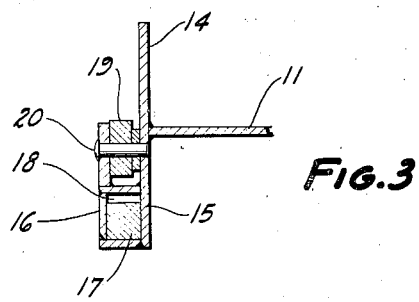
Fig. 3 is a fragmentary view in transverse section taken on line 3—3 of Fig. 1.
Figure 4:
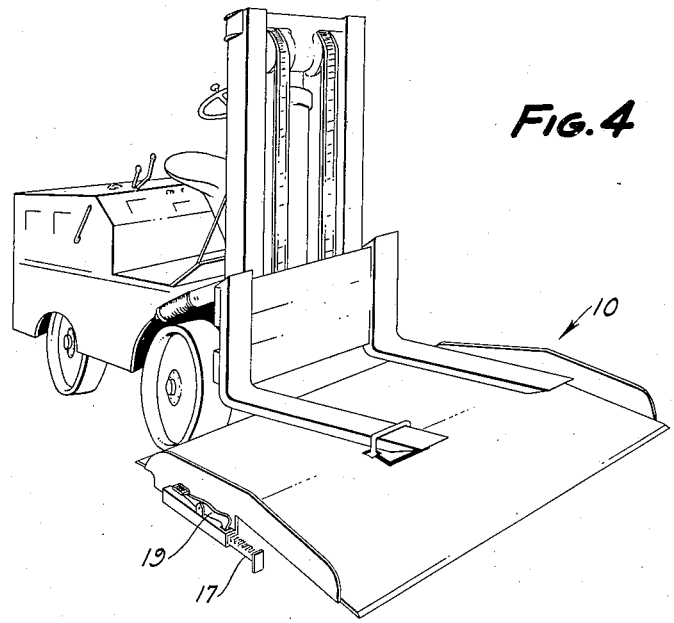
Fig. 4 is a perspective view showing the manner in which the truck lift engages the ramp for transporting the same.

When it is desired to transport or handle the ramp, this bail is upraised, as indicated in dotted lines in Fig. 2, and one fork of the truck lift is projected therethrough, as illustrated in Fig. 4, which enables elevation or lowering of the ramp and also transportation thereof to a desired position.

From the foregoing it is obvious that I have provided a very simple and efficient ramp which is provided with extensible abutment means to insure that it will not become dislodged when in use.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A loading ramp, comprising a bridge member having two side portions, a fixed abutment end and a movable abutment end, an integral flange secured to each side portion extending above said bridge member substantially the length thereof and being provided with a downward extension projecting below said bridge member providing a fixed abutment member adjacent said fixed abutment end, a shaft-receiving member secured to and outwardly of each said flange, said shaft receiving member terminating a substantial distance short of said movable abutment end, a shaft slidably received within said shaft receiving member and provided with ratchet rack teeth along its upper surface, said teeth being adapted to engage a pivoted pawl to permit movement of said shaft toward but to prevent movement thereof away from said movable abutment end, and a pawl having a weighted head and a foot treadle and pivotally supported above said rack to prevent retraction of said shaft.

2. A loading ramp or apron comprising a rigid bridge member adapted to extend between and bear adjacent its ends upon a spaced car platform and dock, said bridge member being substantially flat, extensible abutment means carried by the bridge member to extend between and abut against adjacent sides of said car platform and dock, said abutment means including a fixed member adjacent one end of, underneath and secured to the bridge member to abut against one of said sides of the car platform or dock, means secured to said bridge member along a side thereof providing a track, a rack slidably supported by said track for movement longitudinally of the bridge member whereby it may be abutted against the side opposite that which the fixed member abuts, and a pawl pivotally supported by the bridge member opposite said rack to latch said rack in abutting position.

3. A loading ramp comprising a relatively flat rigid bridge member to extend between a car platform and a dock with its ends overlying the platform and the dock a short distance, a fixed abutment member rigidly secured to one side of and extending longitudinally of the bridge member but short of one end thereof to abut against one side of the car platform or dock, a guide fixed on and extending longitudinally of said fixed abutment member, an elongated movable abutment member guided in said guide for movement longitudinally of the bridge member toward and away from the other side of the platform or dock, ratchet teeth formed along the upper edge of said member, a pawl pivotally supported by the bridge member above said teeth to engage and disengage from said teeth whereby said movable member may be moved longitudinally into abutting position and there latched by engagement of the pawl with said teeth.

4. A loading ramp comprising a relatively flat rigid bridge member to extend between a car platform and a dock with its ends overlying the platform and the dock a short distance, a fixed abutment member rigidly secured to one side of and extending longitudinally of the bridge member but short of one end thereof to abut against one side of the car platform or dock, a guide fixed on and extending longitudinally of said fixed abutment member, an elongated movable abutment member guided in said guide for movement longitudinally of the bridge member toward and away from the other side of the platform or dock, ratchet teeth formed along the upper edge of said member, a pawl pivotally supported by the bridge member above said teeth to engage and disengage from said teeth whereby said movable member may be moved longitudinally into abutting position and there latched by engagement of the pawl with said teeth, a bail member pivoted to the bridge member substantially centrally thereof, said bail member being pivoted to the bridge member beneath the upper surface of the bridge member, the upper surface of the bridge member having a depression formed therein complemental to said bail member to receive the same.

5. In a loading ramp comprising a bridge member and a fixed abutment member secured to said bridge member underneath and at one end thereof, the improvement which comprises an extensible abutment member provided with ratchet rack teeth, a guide secured to said bridge member and supporting said extensible member for sliding movement longitudinally of said bridge member and at a side thereof, and a pawl provided with a foot treadle and pivotally supported by said bridge member opposite said rack teeth and so weighted as normally to engage its head with said rack and prevent retraction of said extensible abutment member.

6. A loading ramp comprising a bridge member having side and end portions, fixed abutment members secured to said bridge member adjacent and beneath one end portion, an extensible abutment member for each side portion having ratchet rack teeth along its upper surface, a guide secured to each side portion slidably supporting an extensible abutment member for movement longitudinally of said side portion, and a pawl provided with a foot treadle and pivotally supported above said rack and so weighted as normally to engage said rack teeth to prevent retraction thereof.

CARL O. CHRISTENSEN.

REFERENCES CITED

The following references are of record in the file of this patent:

UNITED STATES PATENTS

| Number | Name | Date |
|---|---|---|
| 1,144,836 | Green | June 29, 1915 |
| 2,337,138 | Van Berg | Dec. 21, 1943 |
| 2,424,876 | Butler | July 29, 1947 |